US011227027B2

United States Patent
Chang et al.

(10) Patent No.: US 11,227,027 B2
(45) Date of Patent: Jan. 18, 2022

(54) MANAGING ACCESSIBILITY ON CUSTOMER WEB PAGES

(71) Applicant: salesforce.com, inc., San Francisco, CA (US)

(72) Inventors: William Chang, San Jose, CA (US); Cordelia McGee-Tubb, San Francisco, CA (US); Benjamin Drasin, Portland, OR (US); Jacob Roussel, Chicago, IL (US)

(73) Assignee: salesforce.com, inc., San Francisco, CA (US)

( * ) Notice: Subject to any disclaimer, the term of this patent is extended or adjusted under 35 U.S.C. 154(b) by 14 days.

(21) Appl. No.: 16/123,932

(22) Filed: Sep. 6, 2018

(65) Prior Publication Data

US 2020/0082023 A1 Mar. 12, 2020

(51) Int. Cl.
*G06F 16/957* (2019.01)
*G06F 16/958* (2019.01)
*G06F 16/955* (2019.01)
*G09B 21/00* (2006.01)

(52) U.S. Cl.
CPC ........ *G06F 16/986* (2019.01); *G06F 16/9558* (2019.01); *G06F 16/9577* (2019.01); *G09B 21/001* (2013.01)

(58) Field of Classification Search
CPC ... H04L 67/02; G06F 16/986; G06F 16/9558; G06F 16/9577; G09B 21/001
See application file for complete search history.

(56) References Cited

U.S. PATENT DOCUMENTS

| 5,742,768 | A | * | 4/1998 | Gennaro | H04L 67/34 |
| | | | | | 709/203 |
| 7,340,718 | B2 | * | 3/2008 | Szladovics | G06F 9/451 |
| | | | | | 717/106 |
| 9,105,196 | B2 | * | 8/2015 | Dobbs | G09B 19/00 |
| 9,697,299 | B2 | * | 7/2017 | Herbel | G06F 16/972 |
| 2009/0094514 | A1 | * | 4/2009 | Dargahi | G06F 16/95 |
| | | | | | 715/255 |

(Continued)

FOREIGN PATENT DOCUMENTS

EP 0847008 A1 * 10/1998 ............. G06F 9/445

OTHER PUBLICATIONS

"WICG/inert: Polyfill for the intert attribute and property" Github.com, Mar. 23, 2018, available at <https://github.com/WICG/inert>.

*Primary Examiner* — Beau D Spratt
(74) *Attorney, Agent, or Firm* — Sterne, Kessler, Goldstein & Fox P.L.L.C.

(57) ABSTRACT

Disclosed herein are device, system and method embodiments for managing accessibility on customer web pages. A user device operates by receiving selection of a control of an embedded application presented in a webpage including visible content, receiving configuration code associated with the embedded application instance, and presenting a modal dialog on the webpage generated based on the embedded application instance and the configuration code. Further, the user device disables access by an assistive technology to Hypertext Markup Language elements associated with the visible content in response to the presentation of the modal dialog.

20 Claims, 7 Drawing Sheets

(56) References Cited

U.S. PATENT DOCUMENTS

| | | | |
|---|---|---|---|
| 2013/0145357 A1* | 6/2013 | Korycki | G06F 9/44563 |
| | | | 717/172 |
| 2013/0247216 A1* | 9/2013 | Cinarkaya | H04L 67/02 |
| | | | 726/27 |
| 2014/0012878 A1* | 1/2014 | Moussavian | G06Q 50/20 |
| | | | 707/776 |
| 2014/0258829 A1* | 9/2014 | Mackin | G06F 40/174 |
| | | | 715/224 |
| 2018/0088795 A1* | 3/2018 | van Os | G06F 3/04847 |

* cited by examiner

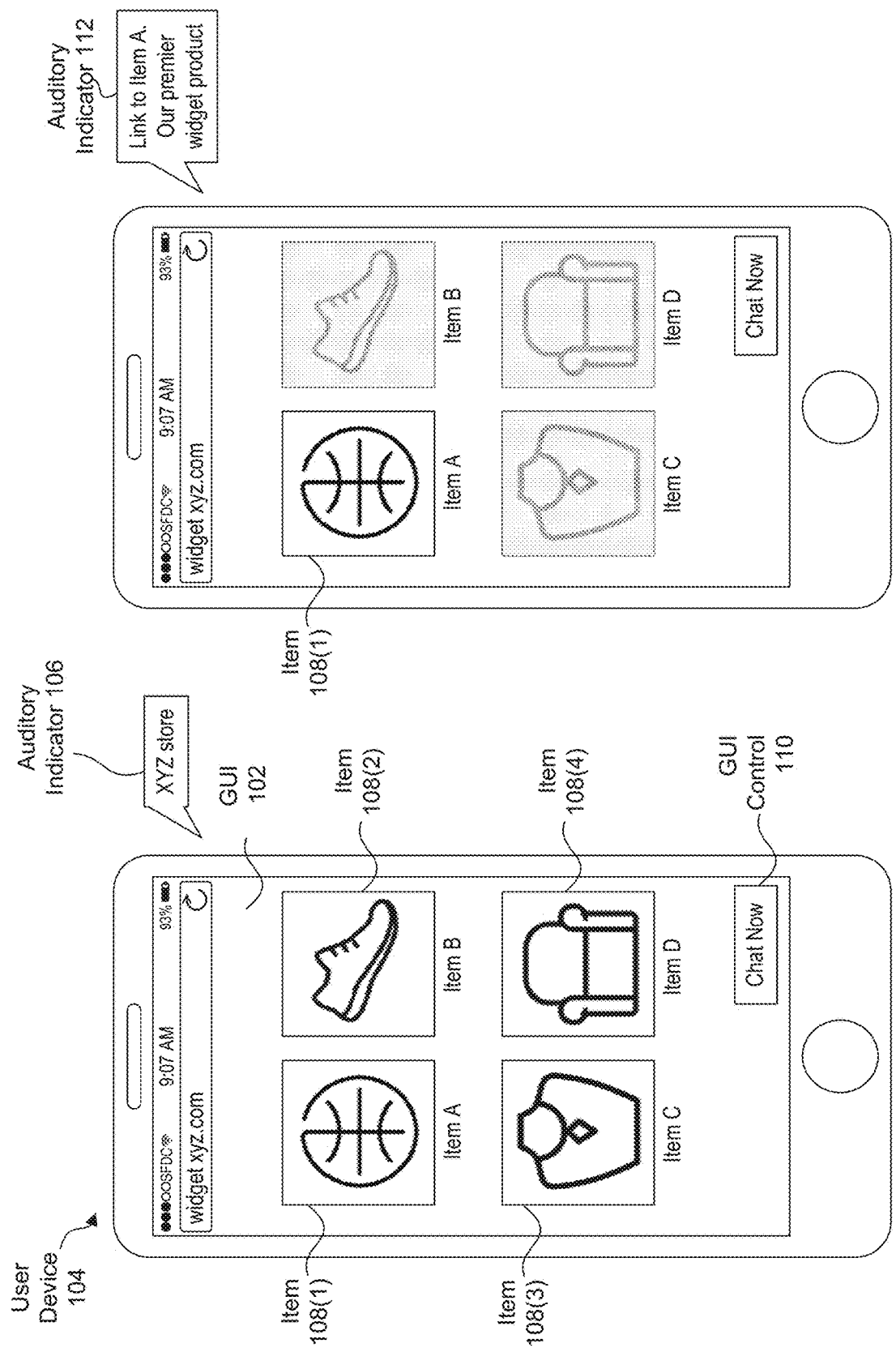

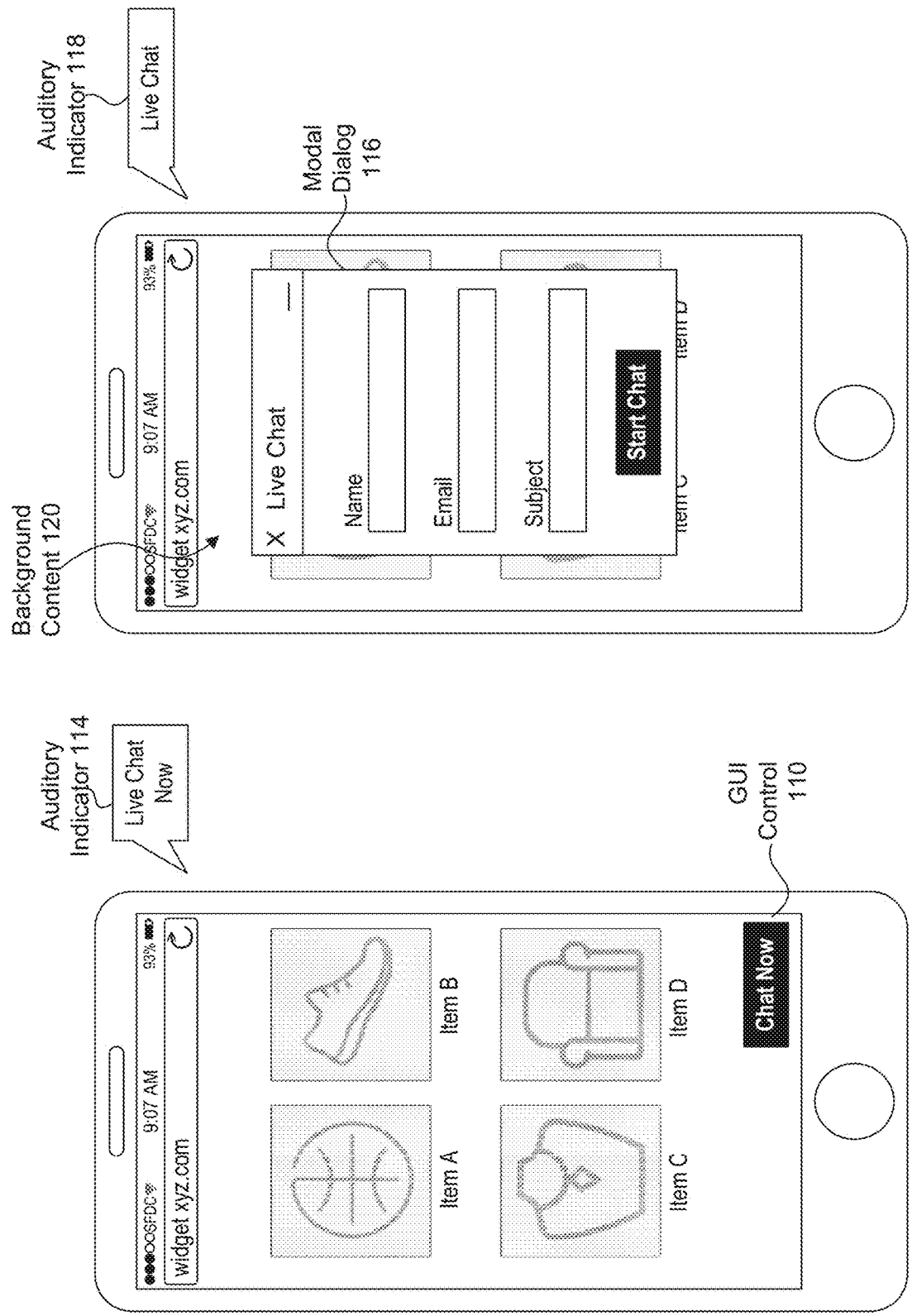

MANAGING ACCESSIBILITY ON CUSTOMER WEB PAGES

BACKGROUND

Many computer users utilize assistive technologies when interacting with the content of a web page. For example, a user may employ a screen reader that reproduces audio information corresponding to the content. Some web pages further include embedded applications that provide complimentary content to the user. In some instances, a web page and an embedded application may not be configured to coherently present the content and complimentary content via an assistive technology. For example, the screen reader may reproduce audio information pertaining to the content of the web page even though the complimentary content overlays the content. As a result, the web page may be inaccessible to persons with disabilities, and fail to meet government mandates concerning the accessibility of electronic and information technology.

BRIEF DESCRIPTION OF THE DRAWINGS

The accompanying drawings are incorporated herein and form a part of the specification.

FIGS. 1A-ID depict example graphical user interfaces for managing accessibility on customer web pages, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 2:
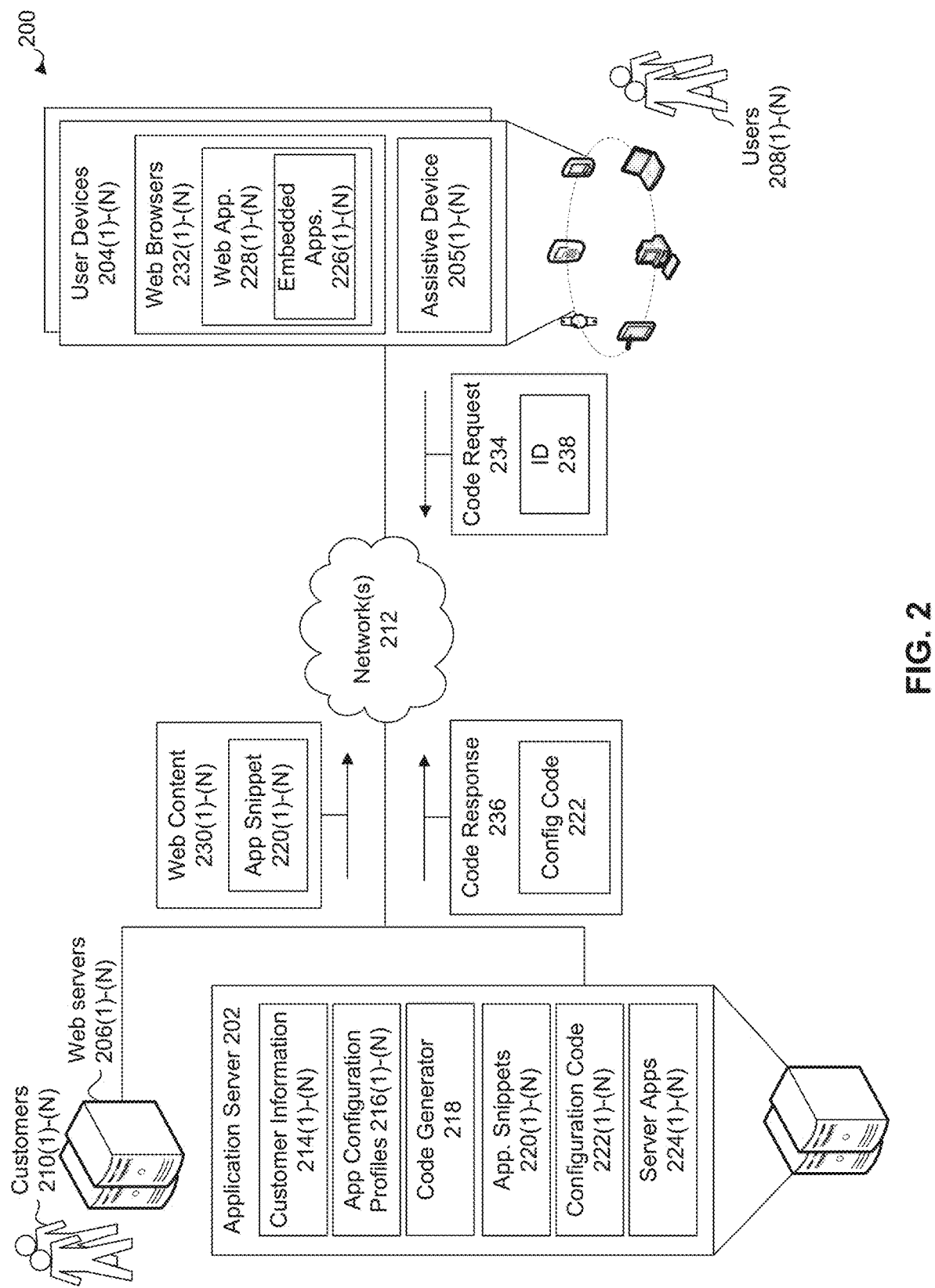
FIG. 2 illustrates a block diagram of an example framework for managing accessibility on customer web pages, according to some embodiments.

Provided herein are system, apparatus, device, method and/or computer program product embodiments, and/or combinations and sub-combinations thereof, for managing accessibility on customer web pages.

FIG. 1A illustrates a graphical user interface (GUI) 102 displayed on a user device 104 including one or more assistive technologies. As referred to herein, a GUI may provide a visual interface for an application. Some examples of an application include computer programs, webpages, web sites, web applications, software applications, mobile apps, hybrid software apps, distributed applications, etc. Further, GUIs provide visual elements which simplify the way a user interacts with an application. Some examples of the user device 104 include smart phones and mobile communication devices, tablet computing devices, desktops, laptops, netbooks, wearable computing devices, etc.

As referred to herein, an assistive technology may be any device or software employed by a user to enhance learning, working, and/or daily life. In some embodiments, an assistive technology may increase, maintain, and/or improve the ability of a user with a disability to use a technological device. Some examples of assistive technologies include screen readers, braille displays, etc.

As illustrated in FIG. 1A, a web browser of the user device 104 may present the GUI 102 when loading a webpage. In addition, a speaker device of the user device 104 may reproduce an auditory indicator 106 as the web page loads to provide navigational context to a user of the user device 104. For example, the auditory indicator 106 may indicate that the GUI 102 is currently displaying the webpage of an electronic commerce store. Further, the GUI 102 may present a plurality of sale items 108(1)-(6) for sale on the webpage, and a GUI control 110 of an embedded application instance that may be selected by a user to launch a modal dialog of the embedded application instance.

An "embedded application" as used herein refers to a user interface component that performs some particular function. In some instances, an embedded application may include a GUI control that can be overlaid on a webpage displayed on the internet. The embedded application may display information in a window or text box, and/or include buttons or other controls that allow a user to access the functionalities of the embedded application. In some examples, an embedded application is a user interface having a portable portion of code that can be installed and executed within a separate web page without compilation. Further, some of the resources accessed by the embedded application may reside at a server physically or logically separate from the web server of the web page in which the embedded application is embedded.

In some embodiments, the embedded application instance may include a chat interface that permits the user to conduct a textual conversation with a chatbot or human operator associated with the electronic commerce store. In some other embodiments, the embedded application instance may include a widget application, a messaging application, a scheduling application, a knowledge base application, a social media application, a file management application, an app installation application, a document editor application, a toolbar, etc.

FIG. 1B illustrates the GUI 102 displayed on the user device 104 including one or more assistive technologies. As illustrated in FIG. 1B, the user may navigate the content of the GUI 102. For example, the user may press a tab key and move a cursor within the GUI 102 to the first sale item 108(1) of the plurality of sale items 108(1)-(6). In addition, a speaker device of the user device 104 may reproduce an auditory indicator 112 that provides navigational context with respect to the manipulation of the cursor within the GUI 102. For example, the auditory indicator 112 may indicate that the cursor is currently at a hypertext markup language (HTML) hyperlink to a webpage associated with the first sale item 108(1).

FIG. 1C illustrates the GUI 102 displayed on the user device 104 including one or more assistive technologies. As illustrated in FIG. 1C, the user may navigate the content of the GUI 102. For example, the user may press a tab key and move a cursor within the GUI 102 to the GUI control 110 of an embedded application. As described in detail herein, the webpage may initially load with a limited version of the embedded application. Further, the limited version of the embedded application may display the GUI control 110 within the GUI 102.

Additionally, a speaker device of the user device 104 may reproduce an auditory indicator 114 that provides navigational context with respect to the manipulation of the cursor within the GUI 102. For example, the auditory indicator 114 may indicate that the cursor is currently at the GUI control 110 configured to launch a chat interface if selected by the user.

FIG. 1D illustrates a modal dialog within the GUI 102 of the user device 104 including one or more assistive technologies. As illustrated in FIG. 1D, the embedded application instance associated with the GUI control 110 may cause the modal dialog 116 to be displayed over top the content of the GUI 102 (e.g., plurality of items 108(1)-(6)). As described in detail herein, upon selection of the GUI control 110, the embedded application instance may request and receive additional code that provides additional functionality (i.e., the modal dialog 116) of the embedded application. Further, the embedded application instance may load and execute the additional code to provide the additional functionality to the user.

In addition, a speaker device of the user device 104 may reproduce an auditory indicator 118 that provides navigational context with respect to the presentation of the modal dialog 116 over top the content 120 of the GUI 102. For example, the auditory indicator 118 may indicate that the chat interface (e.g., the modal dialog 116) has been loaded and presented within the GUI 102.

Further, in some embodiments, the user may be restricted to navigating the contents of the modal dialog 116. For example, as described in detail herein, once the modal dialog 116 is presented over the background content 120 (e.g., the plurality of items 108), the source code of the GUI 102 may be modified to restrict the user from moving the cursor to the background content 120. Furthermore, as a result, any subsequent auditory indicators provided by the assistive technology will be limited to the content of the modal dialog 116. If the user decides to close or minimize the modal dialog 116, the ability to access the plurality of items 108 will be restored.

In some embodiments, limiting access by the assistive technology to the content of the modal dialog improves the ability of the assistive technology to properly convey the active content displayed on the user device 104. As a result, a user with a disability may better comprehend the information currently presented on the user device 104 via the assistive technology. Further, the web page and embedded application may then meet government requirements (e.g., Section 508 of the Rehabilitation Act (29 U.S.C. § 794d) required for approval of electronic and information technology by governmental entities.

FIG. 2 illustrates a block diagram of an example framework for managing accessibility on customer web pages, according to some embodiments. As illustrated in FIG. 2, the system 200 includes an application server 202, a plurality of user devices 204(1)-(N) (e.g., user device 104) associated with assistive devices 205(1)-(N), and a plurality of web servers 206(1)-(N). As referred to herein, an application server may include a hardware and/or software framework dedicated to the execution of procedures (e.g., programs, routines, scripts) for supporting the construction of applications. Further, some of the procedures may include operations for providing the services described herein. As referred to herein, a web server is a computing device or virtual computing device capable of serving at least one web page or web application to a client device.

Further, the user devices 204(1)-(N) may be associated with a plurality of users 208(1)-(N). For example, the first user device 204(1) is associated with a first user 208(1), the second user device 204(2) is associated with a second user 208(2), an Nth user device 204(N) is associated with an Nth user 208(N), and so forth. In addition, the web servers 206(1)-(N) may be associated with a plurality of customers 210(1)-(N) of the application server 202. For example, a first customer 210(1) operates the first web server 206(1), a second customer 210(2) operates the second web server 206(2), an Nth customer 210(N) operates the Nth web server 206(N), and so forth.

Additionally, the application server 202, the user devices 204(1)-(N), and the web servers 206(1)-(N) may communicate via a communication network(s) 212. The communication network(s) 212 may include any or all of a private network, personal area network (PAN), Local-Area Network (LAN), Wide-Area Network (WAN), or the Internet. Further, the connection between the application server 202, the user devices 204(1)-(N), and the web servers 206(1)-(N), and the communication network(s) 212 may be a wireless connection (e.g., Bluetooth, WI-Fi connection, etc.), or a wired connection (e.g., Ethernet, universal serial bus (USB), etc.), or a combination thereof.

As illustrated in FIG. 2, the application server 202 includes customer information 214(1)-(N), application configuration profiles 216(1)-(N), an application snippet generator 218, application snippets 220(1)-(N), configuration code 222(1)-(N), and server applications 224(1)-(N). In some embodiments, the application server 202 may be a multi-tenant system providing a multi-tenant service to the customers 210(1)-(N) (i.e., tenants) operating the web servers 206(1)-(N).

In some embodiments, the application server 202 may provide individual customers 210(1)-(N) with embedded applications 226(1)-(N) (e.g., the embedded application presenting the GUI 102) that may be embedded into web applications 228(1)-(N) provided by the web servers 206(1)-(N) to the user devices 204(1)-(N). For instance, the application server 202 may provide application code (e.g., the application snippet 220(1)) to the customer 210(1), and the customer 210(1) may insert the application code into the web content 230(1) corresponding to the web application 228(1) of the web server 206(1). Upon receipt of the web content 230(1) by the user device 204(1), a web browser 232(1) of the user device 204(1) may load and execute the web application 228(1) containing the embedded application 226(1) based on rendering the web content 230(1).

A "web browser," as referred to herein, may relate to a software application or a software application component for retrieving, rendering, and presenting information resources from the World Wide Web and/or other sources. Web browsers enable users to access and view documents and other resources located on remote servers (e.g., the web servers 206(1)-(N)). For example, the web browser 232(1) may retrieve the web content 230(1) (i.e., the source code of a webpage/web application, and any associated media and/or files) from the web server 206(1) using HTTP, render the web content 230(1) locally, and present the rendered web content 230(1)-(N) graphically to the user 208(1) as the web application 228(1). Some examples of web browser applications include Google Chrome™, Mozilla Firefox™, Microsoft Internet Explorer™, Opera™, and Apple Safari™.

In some embodiments, the application server 202 may host the server applications 224(1)-(N) which support the embedded applications 226(1)-(N). For example, the first server application 224(1) may provide remote resources to the first embedded application 226(1), and the second server application 224(2) may provide remote resources to the second embedded application 226(1). In some other examples, the first server application may provide remote resources to both the first embedded application 226(1) and the second embedded application 226(2). Some examples of remote resources include data storage, application programming interfaces (API), security modules, and/or distributed processing.

In some embodiments, the embedded applications 226(1)-(N) may be different types of applications. For instance, the first embedded application 226(1) may be a server side application for a chat service, and the second embedded application 226(2) may be a server side application for a scheduling service. In addition, the data and services provided by the application server 202 to each customer 210 may be securely isolated from the data and services provided to other customers 210. Additionally, or alternatively, in some embodiments, multiple customers 210 may share access to common data and services.

The customer information 214 includes information associated with the plurality of customers 210(1)-(N) associated with the web servers 206(1)-(N). In some embodiments, the customer information 214 may include customer data for the customers 210(1)-(N), user data for the users 208(1)-(N), security information, security permissions, usage information, configuration preferences, customer management information, etc.

In some embodiments, the customer information 214 may be stored in a multi-tenant database. As used herein, the term "multi-tenant database system" refers to those systems in which various elements of hardware and software of the database system may be shared by one or more customers 210. For example, the application server 202 may simultaneously process requests for the customers 210(1)-(N), and a database table of the application server 202 may store data for the customers 210(1)-(N). As used herein, the term "database" refers to an organized collection of data. In some embodiments, a database may include a plurality of data tables comprising data values (e.g., alphanumeric strings, integers, decimals, floating points, dates, times, binary values, Boolean values, and/or enumerations). Some examples of databases include columnar databases, relational databases, key-store databases, graph databases, and document stores.

The application configuration profiles 216(1)-(N) may include configuration information for the embedded applications 226(1)-(N). For example, a first configuration profile 216(1) is associated with the first embedded application 226(1), and a second configuration profile 216(2) is associated with the second embedded application 226 (2), an Nth application configuration profile 216(N) is associated with the Nth embedded application 226 (N), and so forth. Further, the customers 210(1)-(N) may customize the presentation and functionality of the embedded applications 226(1)-(N) via the configuration information within the application configuration profiles 216(1)-(N). For example, the customer 210(1) may set one or more configuration parameters of the first application configuration profile 216(1) as a means of customizing the embedded application 226(1).

Some configuration parameters included within an application configuration profile 216(1) may include an attribute indicating whether to disable background content when the embedded application 226(1) is in focus within the web application 228(1), an attribute indicating whether to employ a custom method to disable access to background content when the embedded application 226(1) is in focus within the web application 228(1), and/or an attribute indicating whether to employ a custom method to re-enable access to portions of the web application 228(1) when the embedded application 226(1) is out of focus (e.g., closed, minimized, etc.) within the web application 228(1). The application configuration profiles 216(1)-(N) may further include configuration parameters corresponding to language preferences, display preferences (color scheme, graphical effects, etc.), security preferences and settings, logging preferences, error/debug settings, administration settings, etc.

Additionally, the code generator 218 may use the application configuration profiles 216(1)-(N) to generate the application snippets 220(1)-(N) and/or the configuration code 222(1)-(N). In some embodiments, the application snippets 220(1)-(N) and the configuration code 222(1)-(N) combine to the load and execute the embedded applications 226(1)-(N) interpreted by the web browsers 232(1)-(N).

For example, the code generator 218 may generate the application snippet 220(1) to be interpreted and executed as the embedded application 226(1) with branding specific to the first customer 210(1) based on the application configuration profile 216(1). As another example, the code generator 218 may generate the application snippet 220(1) to be interpreted and executed as a version of the embedded application 226(1) that employs a custom method for disabling access to out of focus content based on the application configuration profile 216(1). In some embodiments, the application snippets 220(1)-(N) may be written in JavaScript or any other known web programming language.

As illustrated in FIG. 2, a customer 210(1) may place an application snippet 220(1) into the web content 230(1). Further, the user device 204(1) may request the web content 230(1) from the web server 206(1). Additionally, the user device 204(1) may use the web browser 232(1) to interpret and execute the web content 230(1) to generate the web application 228(1). In particular, the application snippet 220(1) may cause display of a GUI control (e.g., the GUI control 110) of the embedded application 226(1) within the web application 228(1). Upon selection of the GUI control, the application snippet 220(1) may send the application server 202 a request 234 for the configuration code 222(1) corresponding to the embedded application 226(1), and receive a response 236 including the configuration code 222(1) from the application server 202. In some embodiments, the request 234 may include an identifier 238 identifying the embedded application 226(1).

Further, the application snippet 220(1) may load the configuration code 222(1) in order to execute a particular functionality of the embedded application 226(1) within the web application 228(1), and disable access to portions of the web application 228(1) other than the embedded application 226(1). In some embodiments, the application snippet 220(1) may call a static library reference within the application snippet 220(1) to perform the disabling of the portions of the web application 228(1) other than the embedded application 226(1). Additionally, or alternatively, the configuration code 222(1) may include logic configured to disable access to portions of the web application 228(1) other than the embedded application 226(1).

As a result, the assistive device 205 of the user device 204(1) would be able to access the content of the embedded application 226(1) but would not be able access and/or reproduce the remaining portions of the web application 228(1). Additionally, the embedded application 226(1) may re-enable access to portions of the web application 228(1) other than the embedded application 226(1) when the embedded application 226(1) is minimized or closed.

In some embodiments, the application snippet 220(1) may employ a default method for disabling access to portions of the web application 228(1) other than the embedded application 226(1). The default method may identify and monitor HTML nodes within the application code of the web application 228(1) that do not correspond to the embedded application 226(1). Additionally, the default method may modify the identified nodes so that the identified nodes may not be targeted by user interaction events (e.g., mouse and keyboard input), in-page text searches, and text selection. As a result, a user agent (e.g., the browser) may act as if the node is absent from the document object model (DOM) tree for the purposes of targeting by user interaction events, in-page text searches, and text selection. Moreover, the identified nodes may be rendered inaccessible by accessibility readers, such as the assistive device 205.

In some embodiments, the default method may mark the identified nodes as inert. For example, the default method may add the inert attribute to the HTML elements corresponding to the identified nodes (i.e., the HTML tag "<p class="foo"> This is a paragraph </p>" may be modified to "<p class="foo" inert> This is a paragraph </p>"). In some instances, the inert attribute may act recursively to disable access to children nodes of a parent node that has been marked as inert. In addition, the application snippet 220(1) may employ a default method for re-enabling access to portions of the web application 228(1) other than the embedded application 226(1). In some embodiments, the default method may remove the inert attribute from the HTML elements corresponding to the identified nodes.

A "DOM" as referred to herein, may relate to the programming interface for HTML and XML documents, as known in the art. It provides a structured representation (e.g., a tree) of the document and defines a way that the structure can be accessed from programs so that they can change the document structure, style and content. The DOM provides a representation of the document as a structured group of nodes and objects that have properties and methods. A "node" as referred to herein with respect to a web page or web application, may relate to an interface from which a number of DOM types inherit, and allows these various types to be treated similarly.

In some other embodiments, the customer 210(1) may choose to employ a custom method for disabling and re-enabling access to portions of the web application 228(1) besides the embedded application 226(1). In some examples, the application snippet 220(1) may be modified to call methods provided by the customer 210(1) within the application code of the web application 228(1). In some other examples, the customer 210(1) may override the event handlers corresponding to the events (e.g., opening the modal dialog, closing the modal dialog, minimizing the modal dialog, maximizing the modal dialog, etc.) related to the embedded application 226(1), and provide custom logic for disabling and enabling access to portions of the web application 228(1) besides the embedded application 226(1). In some instances, a customer 210(1) may choose to employ a custom method for a first event (e.g., maximizing the modal dialog) while relying on the default method for a second event.

Figure 3:
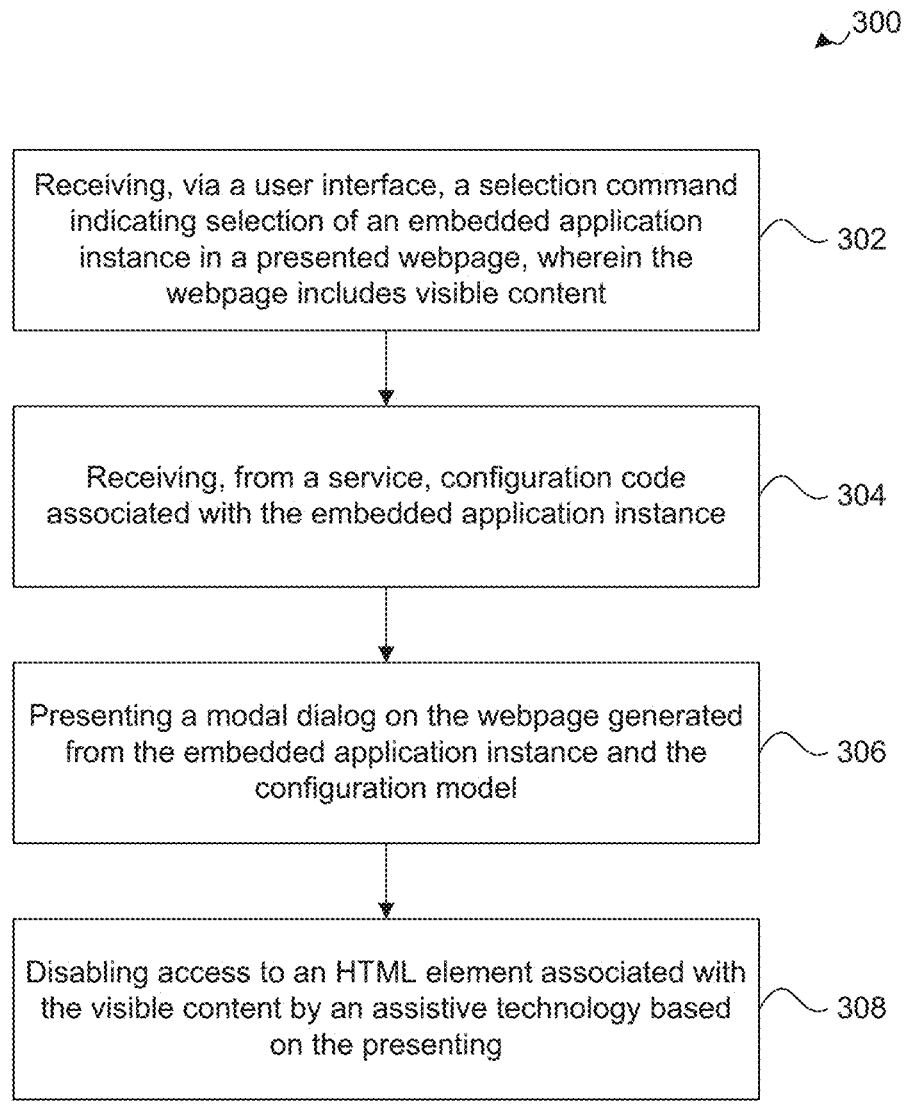
FIG. 3 is a flowchart illustrating example operations for managing accessibility on customer web pages, according to some embodiments.

FIG. 3 illustrates an example method 300 for managing accessibility on customer web pages, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIGS. 1 and 2. However, method 300 is not limited to the example embodiments.

At 302, the user device receives, via a user interface, a selection command indicating selection of an embedded application instance in a presented webpage, wherein the webpage includes visible content. For example, a user of the user device 104 may endeavor to use a functionality of an embedded application 226(1) (e.g., a chat application) embedded within the web application 228(1). As such, the user may select a GUI control (e.g., GUI control 110) of the embedded application 226(1) displayed within a GUI (e.g., GUI 102).

At 304, the user device receives, from a service, configuration code associated with the embedded application instance. For example, the embedded application 226(1) may send the code request 234 to the application server 202. In some embodiments, the code request 234 may include an identifier 238 identifying the embedded application 226(1). Further, the embedded application 226(1) may receive the code response 236 from the application server 202. The code response 236 may include the configuration code 222(1) corresponding to the embedded application 226(1). Additionally, the embedded application 226(1) may retrieve other code and libraries that may be used to load and execute functionality of the embedded application 226(1).

At 306, the user device presents a modal dialog on the webpage generated from the embedded application instance and the configuration code. For example, the embedded application 226(1) may present a modal dialog (e.g., the chat interface of modal dialog 116) within the GUI 102. In some embodiments, the modal dialog (e.g., the chat interface of modal dialog 116) may overlay the other content (e.g., the background content 120) of the web application 228(1).

At 308, the user device disables access to a Hypertext Markup Language (HTML) element associated with the visible content by an assistive technology based on the presenting. For example, the embedded application 226(1) may disable access by the assistive device 205(1) to portions of the web application 228(1) other than the embedded application 226(1) in response to the user 208(1) opening or maximizing the modal dialog.

In some embodiments, the custom application 228(1) may determine that the customer 210(1) has selected to employ a default implementation for disabling access. Further, the custom application 228(1) may identify nodes of the web application 228(1) that do not correspond to the modal dialog 114, and add an inert attribute to the identified nodes. In some other embodiments, the custom application 228(1) may determine that the customer 210(1) has selected to employ a custom implementation for disabling access. Further, the custom application 228(1) may call the custom implementation within the application code corresponding to the custom application 228(1).

Figure 4B:
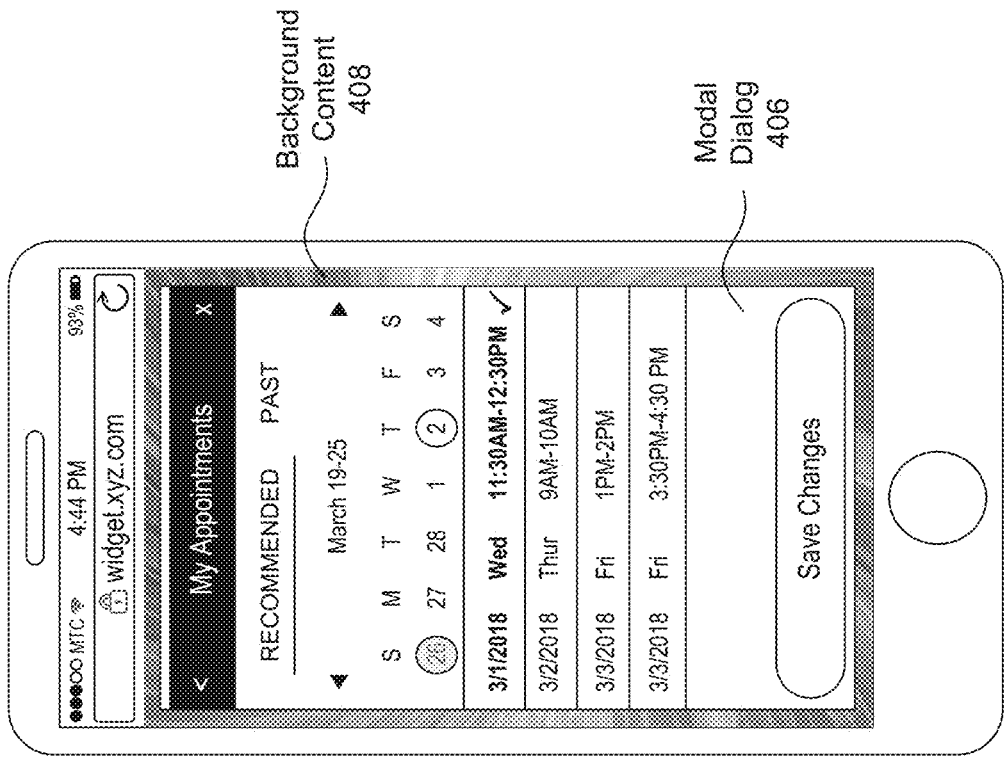
FIGS. 4A-4D depict example graphical user interfaces illustrating modal dialogs, according to embodiments of the present disclosure.
Figure 4A:
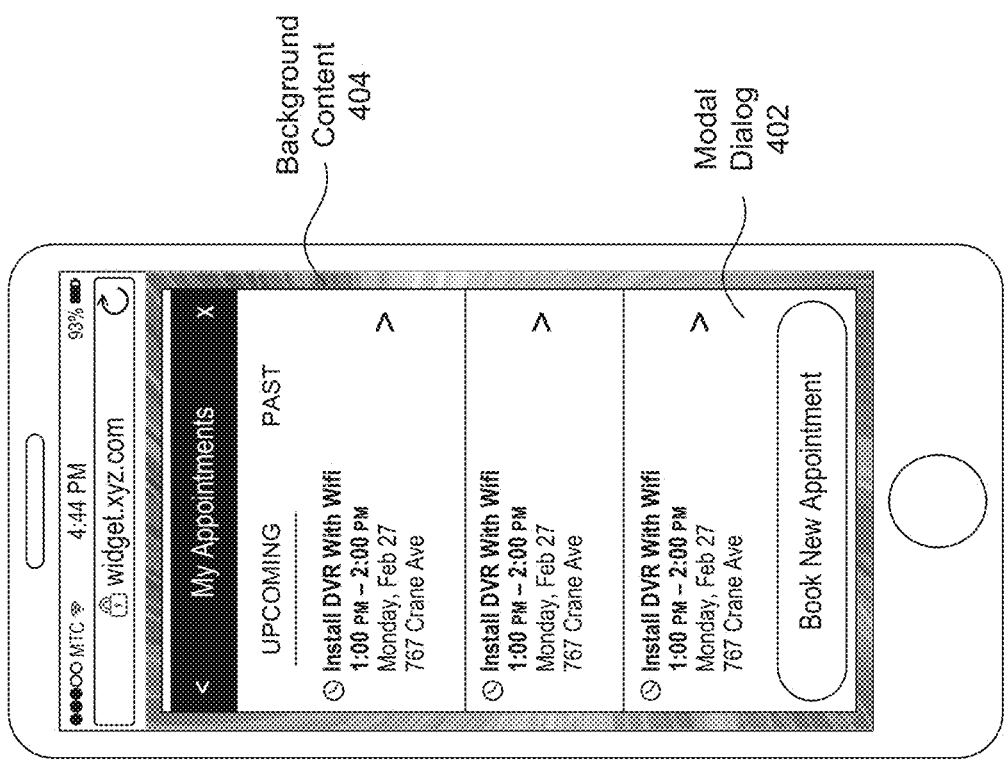
Figure 4D:
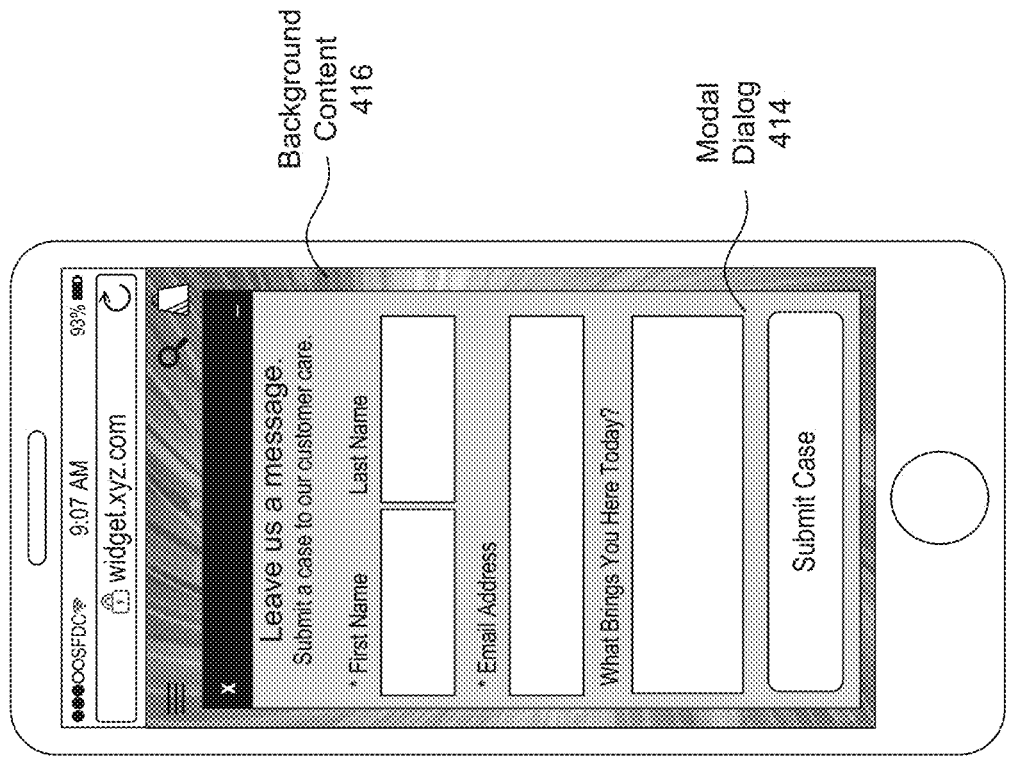
Figure 4C:
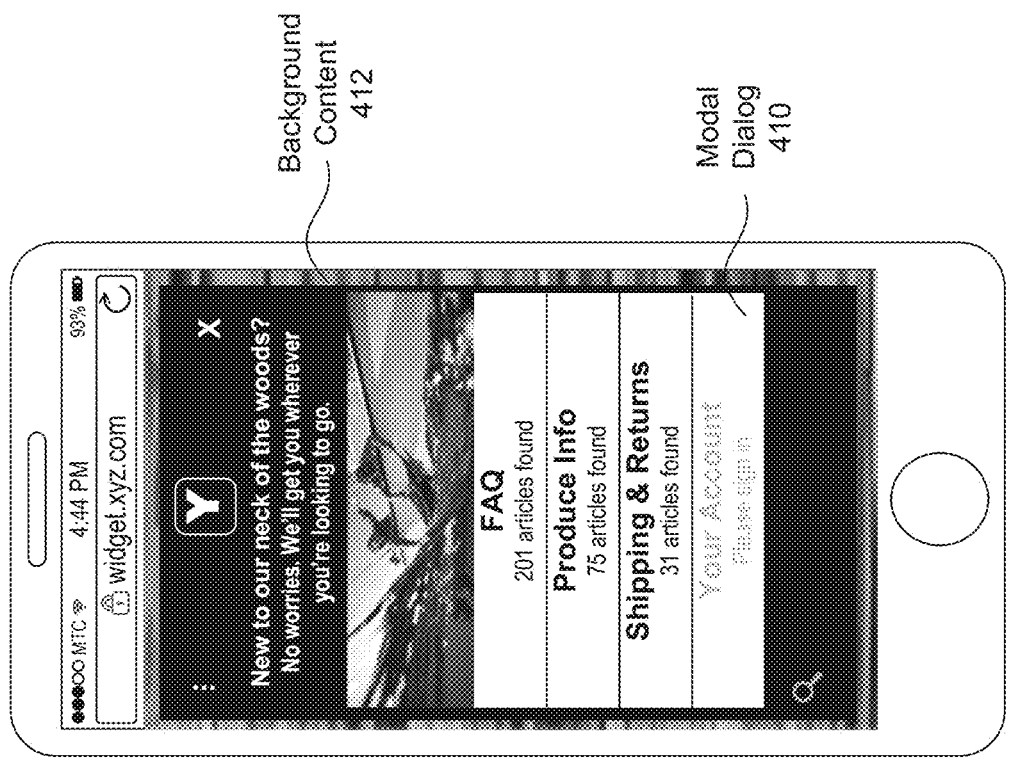
Figure 5:
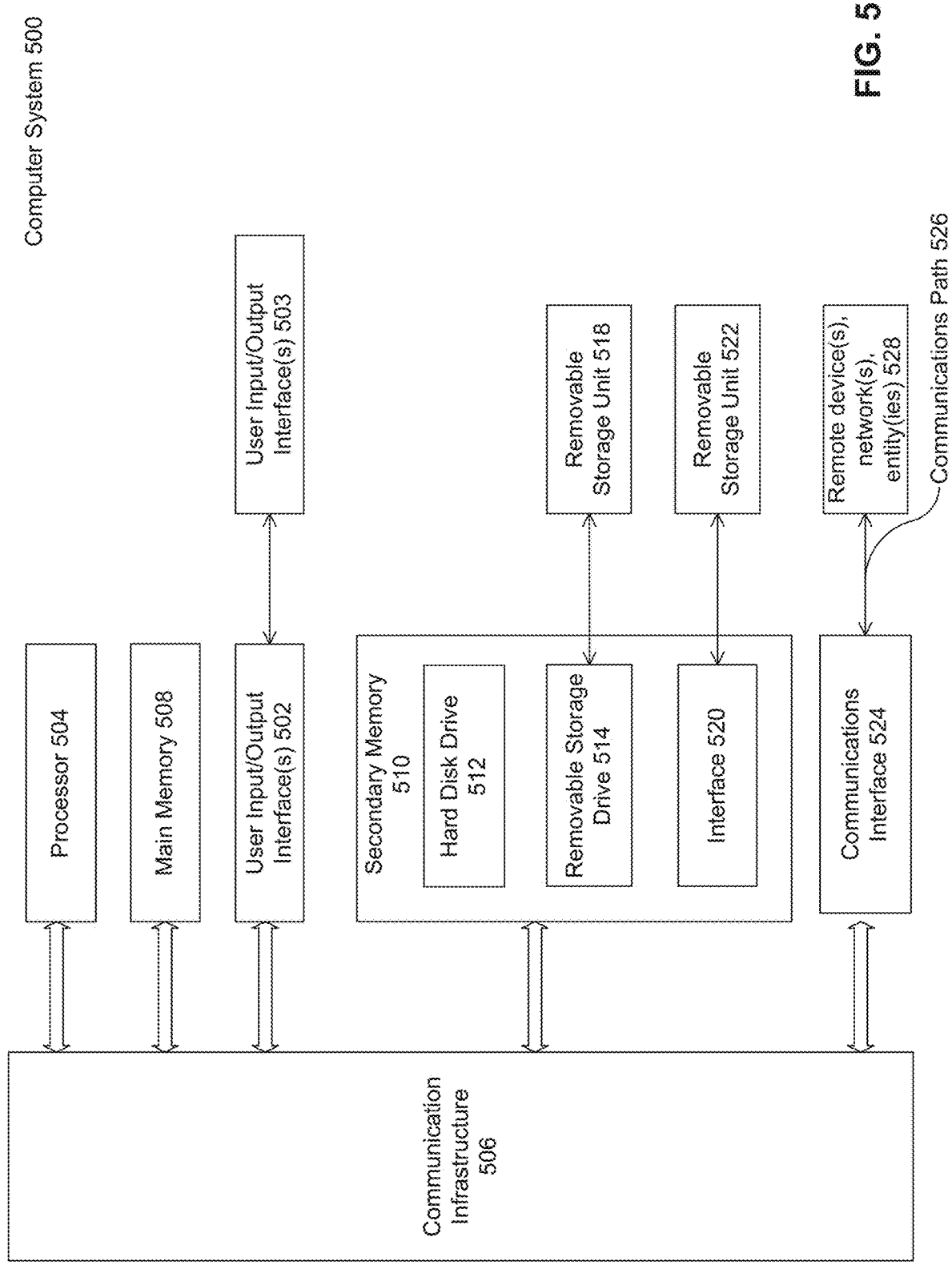
FIG. 5 is an example computer system useful for implementing various embodiments.

FIGS. 4A-D illustrate modal dialogs according to embodiments of the present disclosure. FIGS. 4A-4B display graphical representations of modal dialogs for an embedded appointment application according to embodiments of the present disclosure. FIG. 4C displays a graphical representation of a modal dialog for an embedded knowledge base application according to embodiments of the present disclosure. 4D displays a graphical representation of a modal dialog for an embedded messaging application according to embodiments of the present disclosure. Further, FIGS. 4A-D illustrate the modal dialogs (402, 406, 410, 414) presented over background content (404, 408, 412, 416), respectively. According to embodiments of the present disclosure, the background content (404, 408, 412, and 416) may be inaccessible to assistive technologies when the modal dialogs (402, 406, 410, and 414) are within focus of a GUI.

Various embodiments may be implemented, for example, using one or more well-known computer systems, such as application server 202, user devices 204, and web servers 206 shown in FIG. 2. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   causing display of a webpage including visible content corresponding to at least one Hypertext Markup Language (HTML) element configured to generate an output of an assistive technology responsive to movement of an input proximate to at least a portion of the visible content;
   receiving, from a user interface of a user device, a selection command indicating selection of an embedded application instance in the webpage displayed on the user device, wherein the webpage includes the visible content; and
   sending configuration code to the user device associated with the embedded application instance, wherein the configuration code, when rendered:
      causes loading and executing of a web application corresponding to the embedded application instance;
      causes display of a modal dialog on the webpage, the modal dialog being generated by the rendering, wherein the modal dialog is displayed over the visible content;
      causes disabling of access to the at least one HTML element associated with the visible content by the assistive technology, based on the display of the modal dialog, wherein the disabling of access results in the access of the assistive technology being limited to content of the modal dialog, and wherein the assistive technology is configured to provide one or more auditory indicators of the content of the modal dialog; and
      causes re-enabling of access to the at least one HTML element associated with the visible content by the assistive technology and by the one or more auditory indicators based on an occurrence of an event.

2. The method of claim 1, wherein the disabling of access to the at least one HTML element associated with the visible content comprises:
   identifying the at least one HTML element within a tree structure of an HTML document; and
   setting an inert attribute of the at least one HTML element.

3. The method of claim 1, wherein the disabling of access to the at least one HTML element associated with the visible content comprises:
   determining that the webpage includes a custom method for the disabling; and
   calling the custom method.

4. The method of claim 1, further comprising:
   determining the occurrence of the event, wherein the event is associated with the modal dialog.

5. The method of claim 4, wherein the re-enabling of access to the at least one HTML element comprises:
   identifying the at least one HTML element within a tree structure of the HTML document; and
   removing an inert attribute of the at least one HTML element.

6. The method of claim 4, wherein the re-enabling of access to the at least one HTML element comprises:
   determining that the webpage includes a custom method for the re-enabling of access; and
   calling the custom method.

7. The method of claim 4, wherein the event includes at least one of minimizing the modal dialog or closing the modal dialog.

8. The method of claim 1, wherein the modal dialog includes at least one of a chat application, chatbot application, embedded widget, messaging application, scheduling application, or knowledge base application.

9. The method of claim 1, wherein the assistive technology includes at least one of a screen reader or a braille display.

10. The method of claim 1, wherein the configuration code is sent from a multi-tenant application and the webpage is operated by a tenant of the multi-tenant application.

11. A system, comprising:
   a memory;
   an assistive device; and
   at least one processor coupled to the memory and configured to:
      cause display of a webpage including visible content corresponding to at least one Hypertext Markup Language (HTML) element configured to generate an output of an assistive technology from the assistive device by a response to movement of an input proximate to at least a portion of the visible content;

receive, from a user interface of a user device, a selection command indicating selection of an embedded application instance in the webpage displayed on the user device, wherein the webpage includes the visible content; and send configuration code to the user device associated with the embedded application instance, wherein the configuration code, when rendered:

causes display of a modal dialog on the webpage, the modal dialog generated by the rendering, wherein the modal dialog is displayed over the visible content;

causes disabling of access to the at least one HTML element associated with the visible content by the assistive device based on the display of the modal dialog, wherein the disabling of access results in the access of the assistive technology being limited to content of the modal dialog, and wherein the assistive technology is configured to provide one or more auditory indicators of the content of the modal dialog; and causes re-enabling of access to the at least one HTML element associated with the visible content by the assistive technology and by the one or more auditory indicators based on an occurrence of an event.

12. The system of claim 11, wherein the disabling of access to the at least one HTML element associated with the visible content comprises:

identifying the at least one HTML element within a tree structure of an HTML document; and setting an inert attribute of the at least one HTML element.

13. The system of claim 11, wherein the disabling of access to the at least one HTML element associated with the visible content comprises:

determine that the webpage includes a custom method for the disabling of access; and calling the custom method.

14. The system of claim 11, wherein the at least one processor is further configured to:

determine the occurrence of the event, wherein the event is associated with the modal dialog.

15. The system of claim 11, wherein the modal dialog includes at least one of a chat application, messaging application, scheduling application, or knowledge base application.

16. The system of claim 11, wherein the assistive device includes at least one of a screen reader or a braille display.

17. The system of claim 11, wherein the configuration code is sent from a multi-tenant application and the webpage is operated by a tenant of the multi-tenant application.

18. A non-transitory computer-readable device having instructions stored thereon that, when executed by at least one computing device, cause the at least one computing device to perform operations comprising:

causing display of a webpage including visible content corresponding to at least one Hypertext Markup Language (HTML) element configured to generate an output of an assistive technology responsive to movement of an input proximate to at least a portion of the visible content;

receiving, from a user interface of a user device, a selection command indicating selection of an embedded application instance in the webpage displayed on the user device, wherein the webpage includes the visible content; and sending configuration code to the user device associated with the embedded application instance, wherein the configuration code, when rendered:

causes loading and executing of a web application corresponding to the embedded application instance;

causes display of a modal dialog on the webpage, the modal dialog generated by the rendering, wherein the modal dialog is displayed over the visible content;

causes disabling of access, by user interaction events, to the at least one HTML element associated with the visible content, based on the display of the modal dialog, wherein the disabling of access results in the access of the assistive technology being limited to content of the modal dialog, and wherein the assistive technology is configured to provide one or more auditory indicators of the content of the modal dialog; and causes re-enabling of access to the at least one HTML element associated with the visible content by the assistive technology and by the one or more auditory indicators based on an occurrence of an event.

19. The non-transitory computer-readable device of claim 18, wherein the disabling of access to the at least one HTML element associated with the visible content comprises setting an inert attribute of the at least one HTML element.

20. The non-transitory computer-readable device of claim 18, the operations further comprising:

determining the occurrence of the event, wherein the event is associated with the modal dialog.

\* \* \* \* \*